(12) United States Patent
Fernandes Godoy Almeida (10) Patent No.: US 12,502,043 B2
(45) Date of Patent: Dec. 23, 2025

(54) CONFIGURATION FOR AN ELECTRONIC DEVICE FOR AUTOMATING A TOILET BOWL LID

(71) Applicant: Gustavo Fernandes Godoy Almeida, Recife (BR)

(72) Inventor: Gustavo Fernandes Godoy Almeida, Recife (BR)

( * ) Notice: Subject to any disclaimer, the term of this patent is extended or adjusted under 35 U.S.C. 154(b) by 36 days.

(21) Appl. No.: 18/039,714

(22) PCT Filed: Oct. 21, 2021

(86) PCT No.: PCT/BR2021/050462
§ 371 (c)(1),
(2) Date: May 31, 2023

(87) PCT Pub. No.: WO2022/051832
PCT Pub. Date: Mar. 17, 2022

(65) Prior Publication Data
US 2024/0000274 A1 Jan. 4, 2024

(30) Foreign Application Priority Data

May 14, 2021 (BR) ...................... 10 2021 009493 1

(51) Int. Cl.
*A47K 13/10* (2006.01)
(52) U.S. Cl.
CPC .................................. *A47K 13/10* (2013.01)
(58) Field of Classification Search
CPC ................................ A47K 13/10; A47K 13/26
See application file for complete search history.

(56) References Cited

U.S. PATENT DOCUMENTS

| 6,112,336 A | 9/2000 | Markle et al. |
| 6,226,804 B1 | 5/2001 | Ballard |
| (Continued) | | |

FOREIGN PATENT DOCUMENTS

| FR | 2603180 A1 | 3/1988 |
| KR | 101053150 B1 | 8/2011 |

OTHER PUBLICATIONS

Almeida, G., PCT/BR2021/050462, International Search Report, Jan. 16, 2022, 7 pages.
(Continued)

*Primary Examiner* — Christine J Skubinna
(74) *Attorney, Agent, or Firm* — SHUTTLEWORTH & INGERSOLL, PLC; Jason R. Sytsma (57) ABSTRACT

The electronic device for automating a toilet bowl lid was developed to automate the operation of lifting and lowering toilet bowl lids without manual contact through the incorporation of a device in the toilet bowl and the respective lid and seat. The present industrial design registration discloses a novel, original configuration applied to this device, the use of which is aimed at plumbing facilities (field of application: sanitary plumbing), for both domestic applications and industrial applications, health facilities (hospitals, emergency services, clinics), public facilities (public bodies, government departments, etc.), toilets (hotels, stores, businesses, offices, service stations, workshops, etc.) and other locations where there are sanitary appliance facilities built and installed in accordance with the Brazilian standards in force.

8 Claims, 11 Drawing Sheets

(56) References Cited

U.S. PATENT DOCUMENTS

| | | | | |
|---|---|---|---|---|
| 7,987,528 | B1* | 8/2011 | Ross | A47K 13/10 |
| | | | | 4/246.3 |
| 8,024,821 | B2* | 9/2011 | Chen | A47K 13/26 |
| | | | | 4/240 |
| 9,386,892 | B2* | 7/2016 | Korzelski | A47K 13/12 |
| 10,743,729 | B1* | 8/2020 | Tendeng | A47K 13/10 |
| 2006/0242755 | A1* | 11/2006 | Lohss | A47K 13/10 |
| | | | | 4/246.1 |
| 2009/0106885 | A1 | 4/2009 | Sagre | |
| 2010/0083431 | A1* | 4/2010 | Hallett | A47K 13/10 |
| | | | | 4/246.1 |
| 2011/0035866 | A1* | 2/2011 | Ricca | A47K 13/10 |
| | | | | 4/246.3 |
| 2013/0318695 | A1 | 12/2013 | De Vito, Jr. | |
| 2014/0047629 | A1 | 2/2014 | Stauber et al. | |
| 2015/0272409 | A1* | 10/2015 | Cayabyab | A47K 13/10 |
| | | | | 4/246.3 |

OTHER PUBLICATIONS

Almeida, G., PCT/BR2021/050462, Written Opinion, Jan. 16, 2022, 12 pages.

* cited by examiner

CONFIGURATION FOR AN ELECTRONIC DEVICE FOR AUTOMATING A TOILET BOWL LID

APPLICATION FIELD

The ELECTRO-ELECTRONIC DEVICE FOR TOILET LID AUTOMATION was developed to automate the operation of lifting and lowering the toilet lid without manual contact, by incorporating a device to the toilet and its lid and seat. The present Utility Model features a new and original configuration applied to this device, the use of which focuses on hydraulic facilities (sanitary hydraulic application field) for residential and industrial applications, health (hospitals, emergency rooms, clinics), public facilities (public offices, government departments, etc.), toilets (hotels, stores, businesses, offices, gas stations, workshops, etc.) and other locations where there are facilities with toilets built and installed in accordance with the Brazilian standards in force.

PRIOR ART

Document U.S. Ser. No. 10/743,729 features an automated toilet seat lift system and comprises a toilet and a lifting mechanism. The lifting mechanism connects to the toilet. The toilet further includes a tank, a bowl, a toilet seat, and a toilet lid. The lifting mechanism is an automated device used to lift and lower the toilet seat and the toilet lid in the preparation process, and during the use of the toilet. The lifting mechanism operates in such a way that the toilet seat and lid are lifted when a user is detected in the vicinity of the toilet. The lifting mechanism returns the toilet seat to a lowered position when the user is no longer detected in the vicinity of the toilet.

The ELECTRO-ELECTRONIC DEVICE FOR TOILET LID AUTOMATION herein, object of the present Utility Model has a new exclusive and modern configuration, which is provided with high functional and aesthetic content.

The configuration applied to the ELECTRO-ELECTRONIC DEVICE FOR TOILET LID AUTOMATION is clearly seen in the figures shown below.

Figure 1:
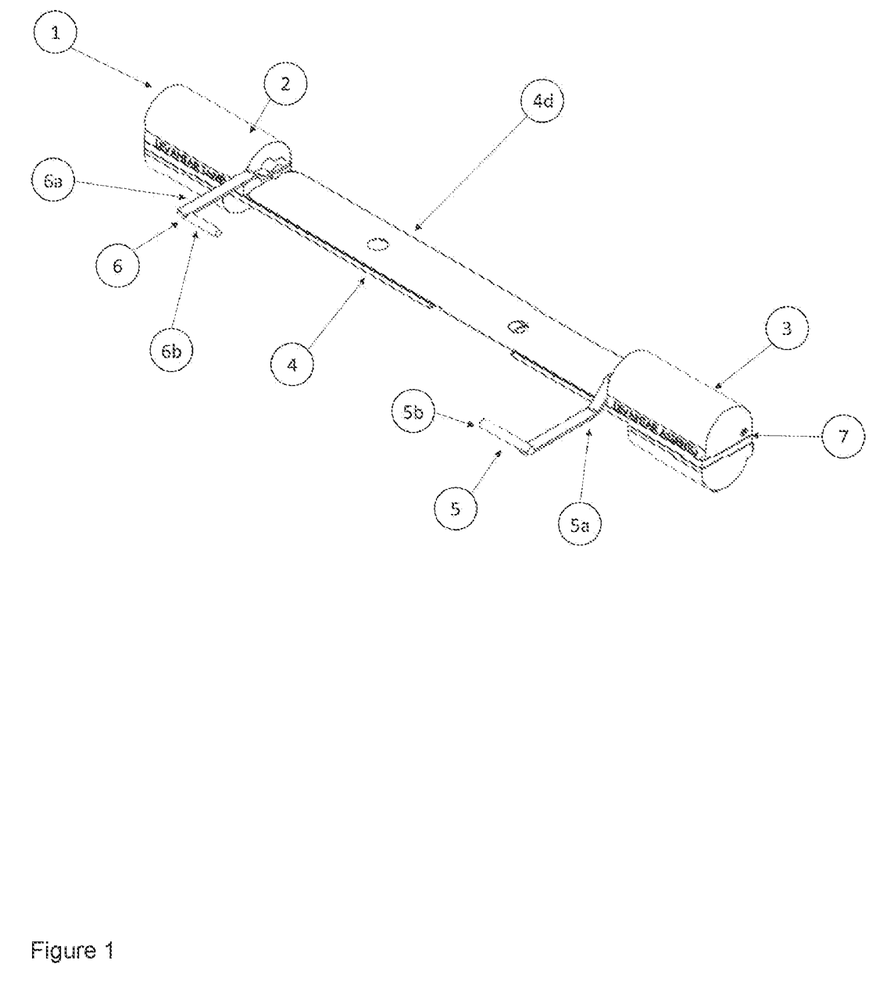
FIG. 1 shows the ELECTRO-ELECTRONIC DEVICE FOR TOILET LID AUTOMATION—top view.
Figure 2:
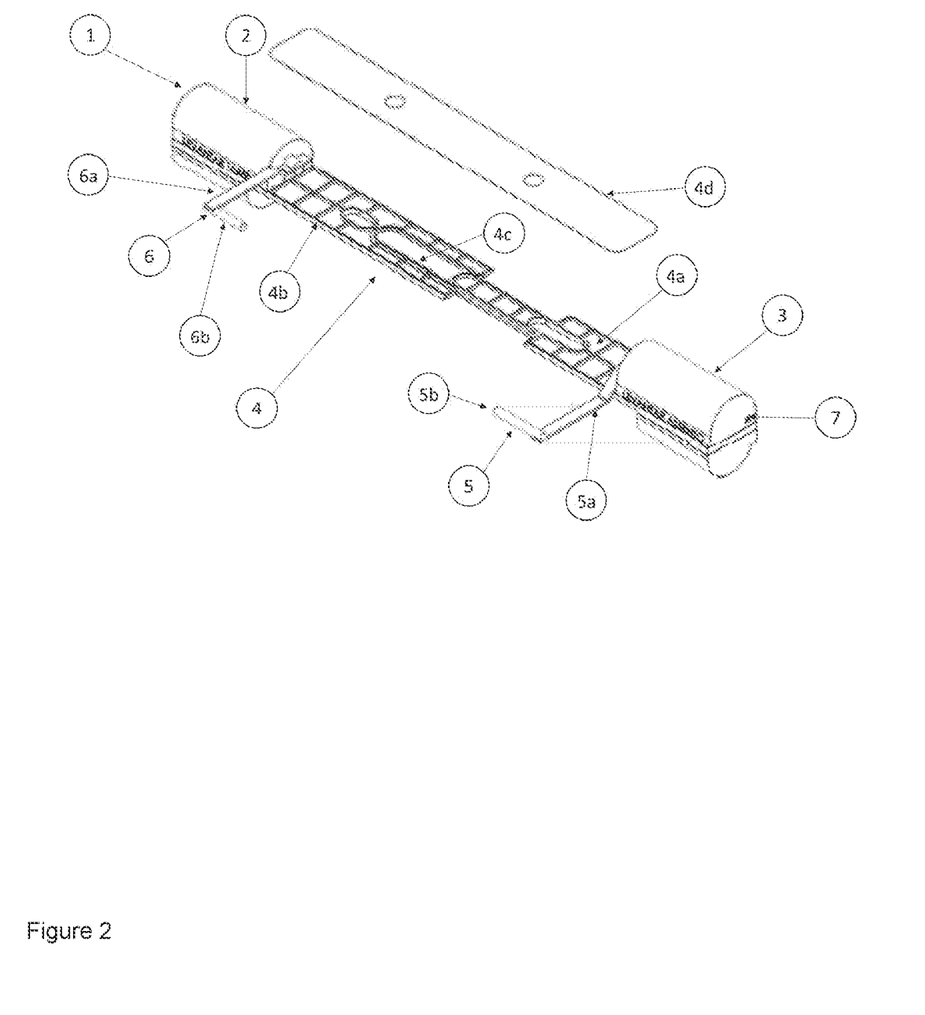
FIG. 2 shows the ELECTRO-ELECTRONIC DEVICE FOR TOILET LID AUTOMATION—top view with internal details of the fixing element.
Figure 3:
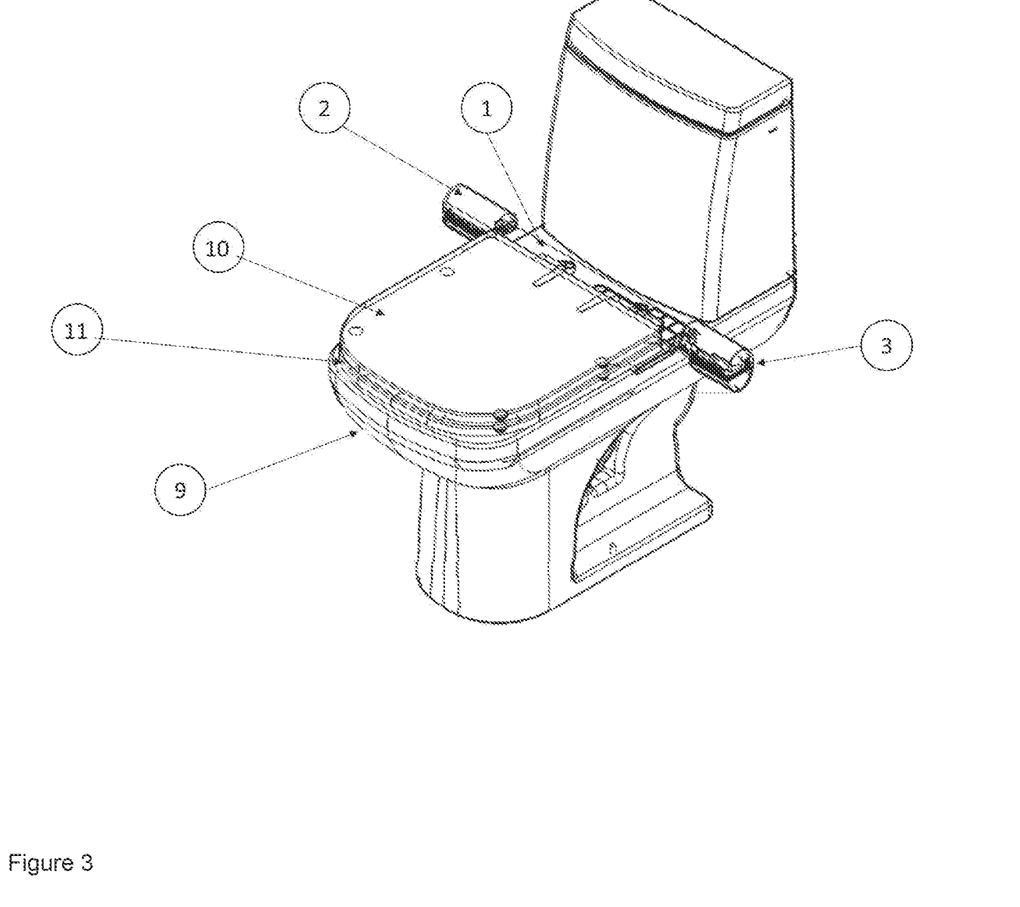
FIG. 3 shows the ELECTRO-ELECTRONIC DEVICE FOR TOILET LID AUTOMATION in a situation of use (mounted)—top view (closed position).
Figure 4:
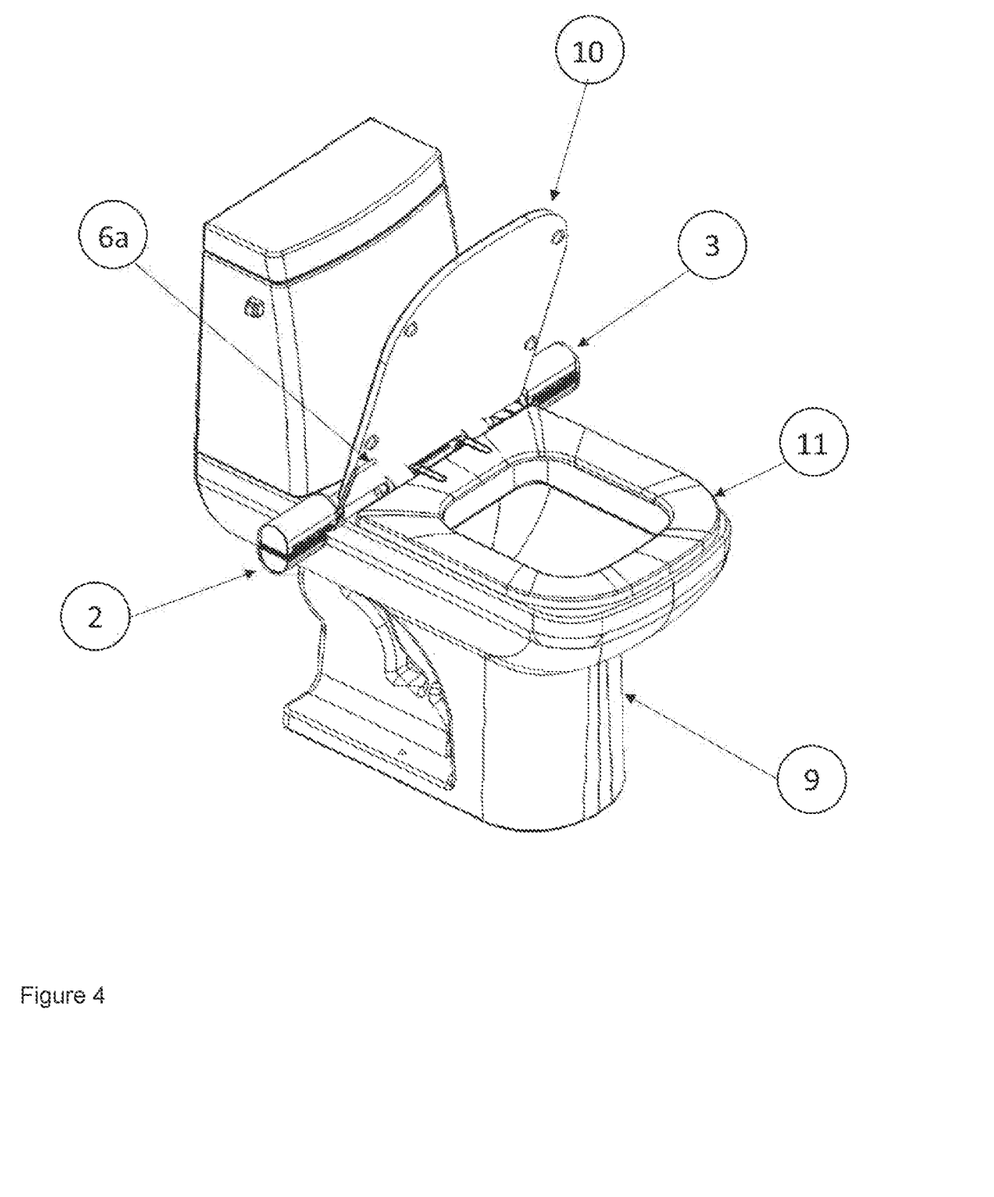
FIG. 4 shows the ELECTRO-ELECTRONIC DEVICE FOR TOILET LID AUTOMATION in a situation of use (mounted)—top view (lifted lid position).
Figure 5:
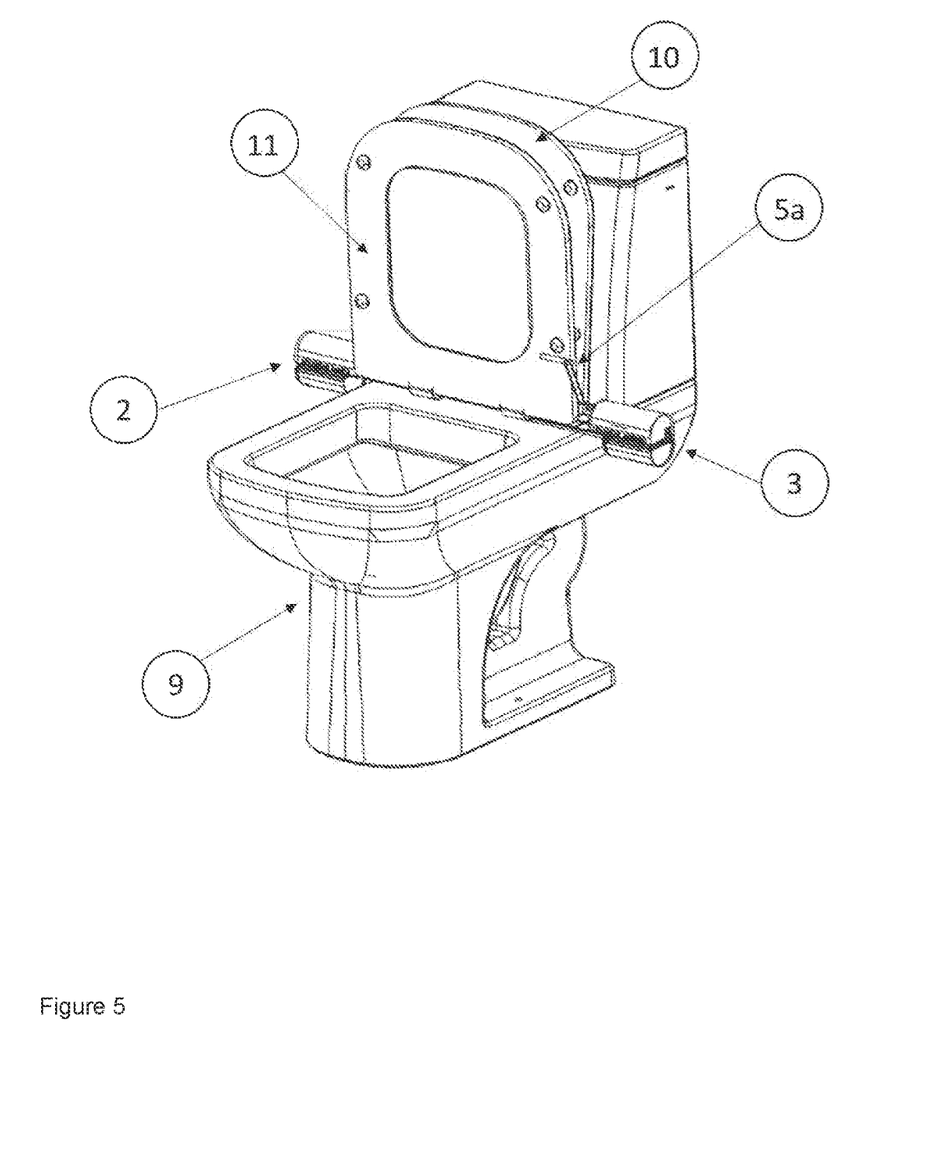
FIG. 5 shows the ELECTRO-ELECTRONIC DEVICE FOR TOILET LID AUTOMATION in a situation of use (mounted)—top view (lifted seat position).
Figure 6:
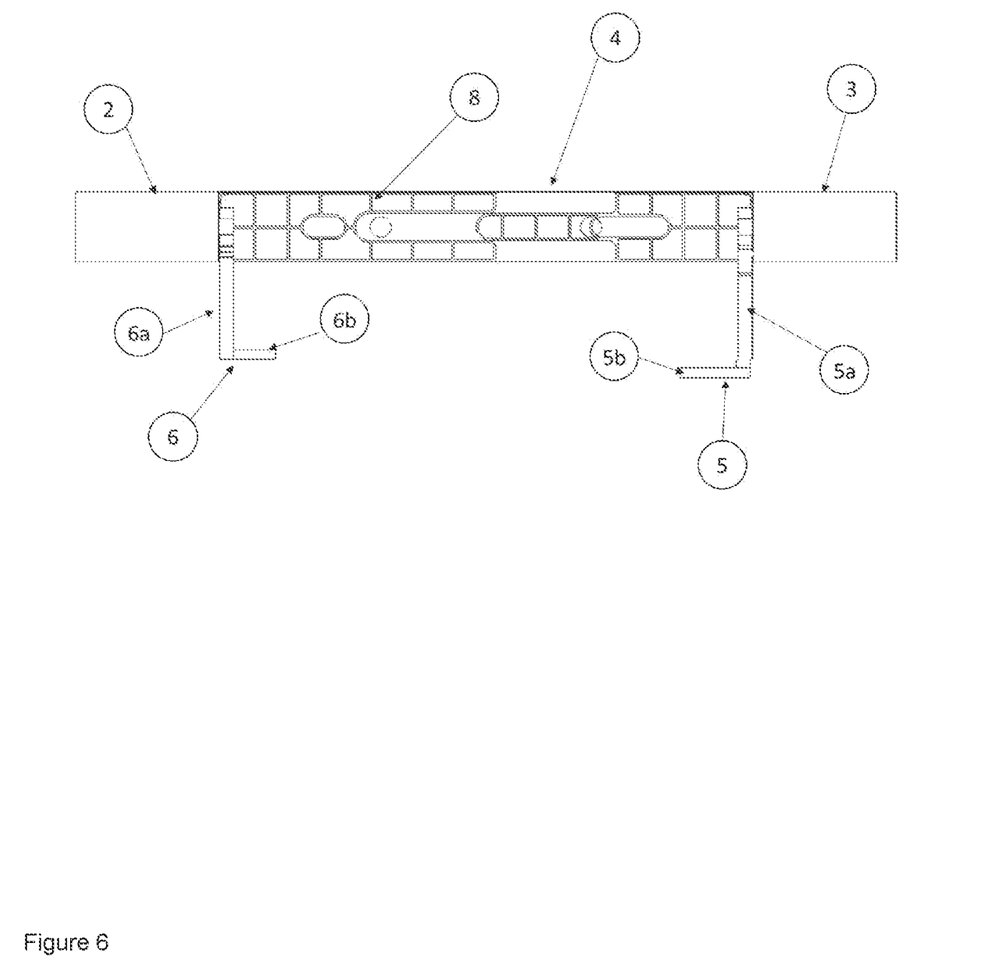
FIG. 6 shows the ELECTRO-ELECTRONIC DEVICE FOR TOILET LID AUTOMATION—top view.
Figure 7:
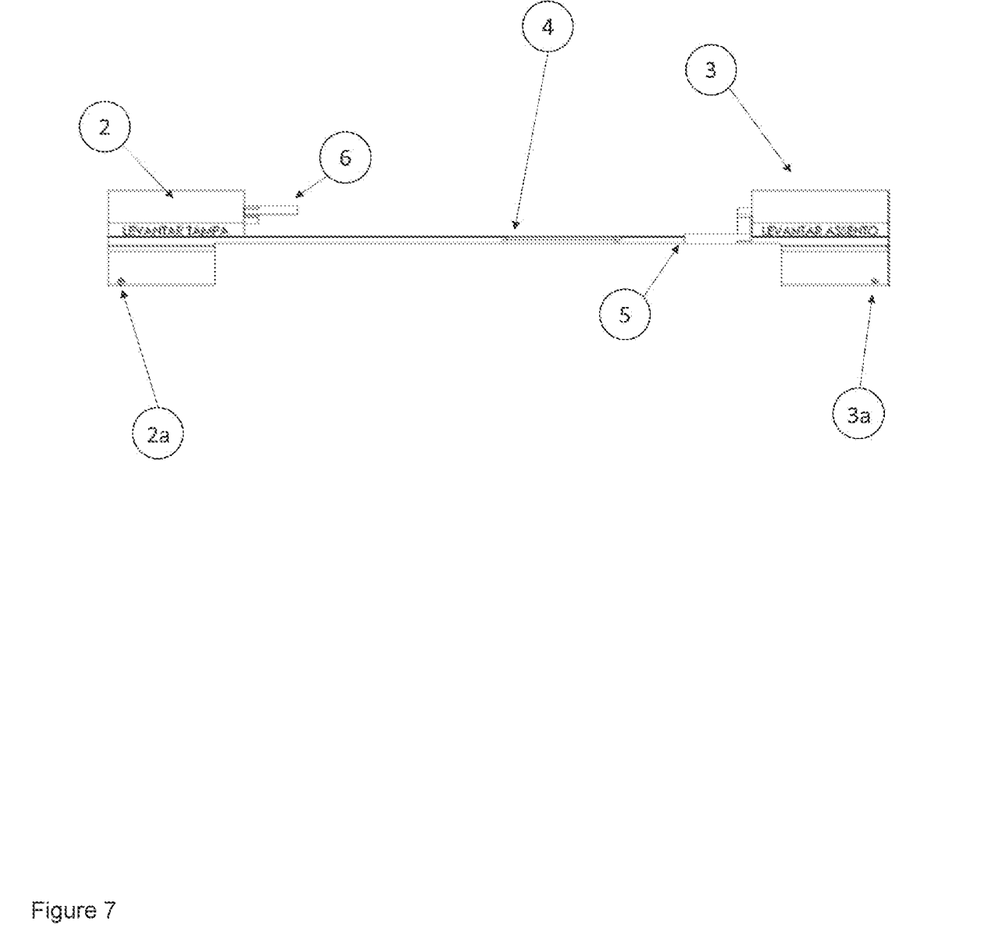
FIG. 7 shows the ELECTRO-ELECTRONIC DEVICE FOR TOILET LID AUTOMATION—front view.
Figure 8:
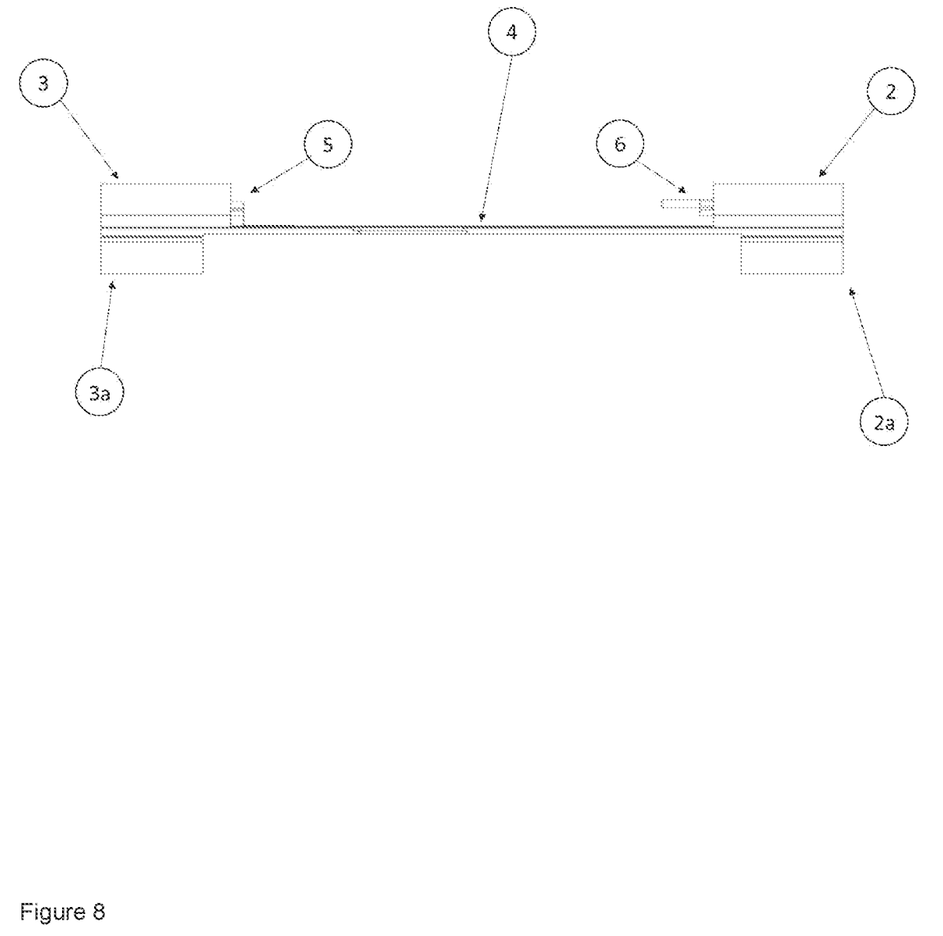
FIG. 8 shows the ELECTRO-ELECTRONIC DEVICE FOR AUTOMATION OF TOILET LID—rear view.
Figure 9:
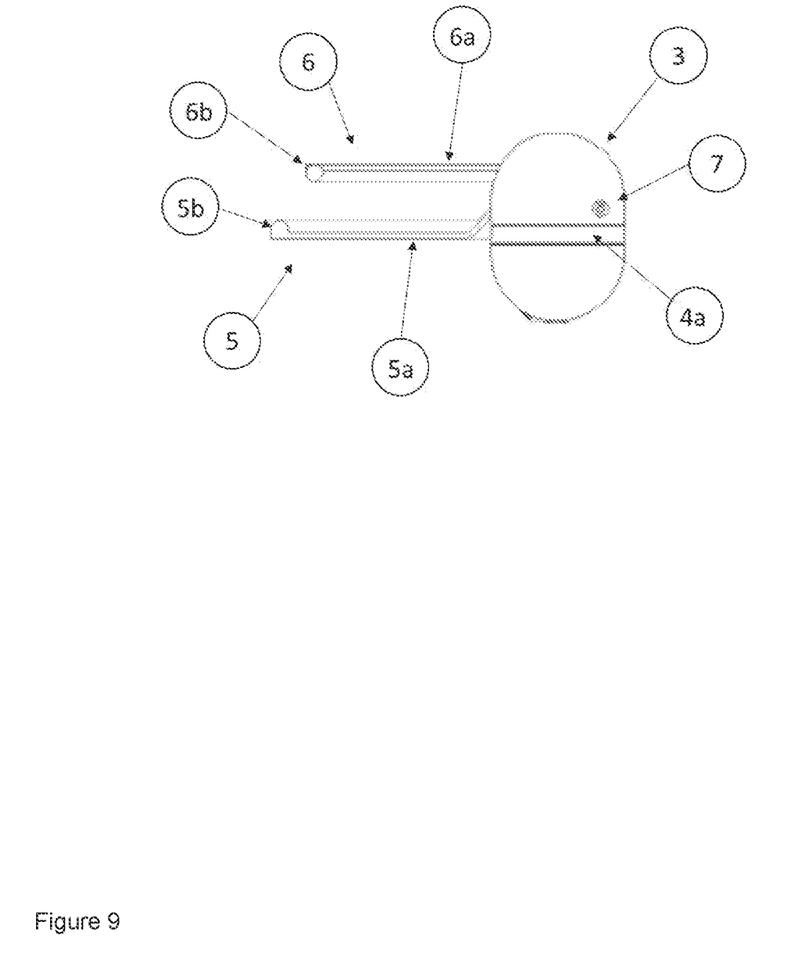
FIG. 9 shows the ELECTRO-ELECTRONIC DEVICE FOR TOILET LID AUTOMATION—left side view.
Figure 10:
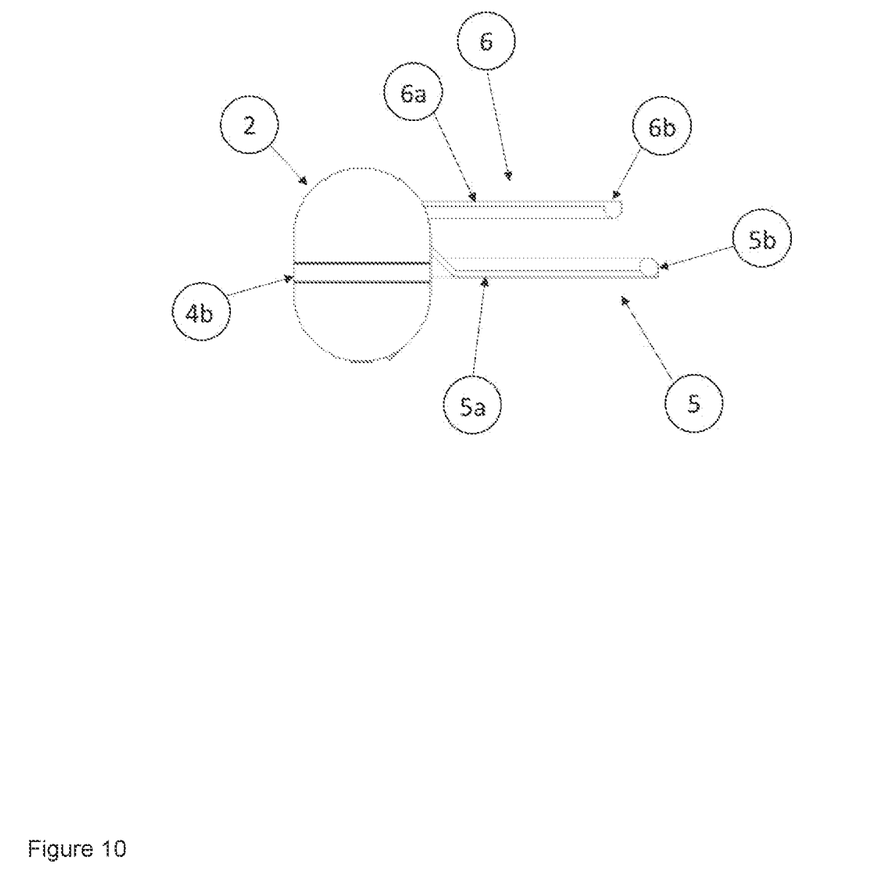
FIG. 10 shows the ELECTRO-ELECTRONIC DEVICE FOR TOILET LID AUTOMATION—right side view.
Figure 11:
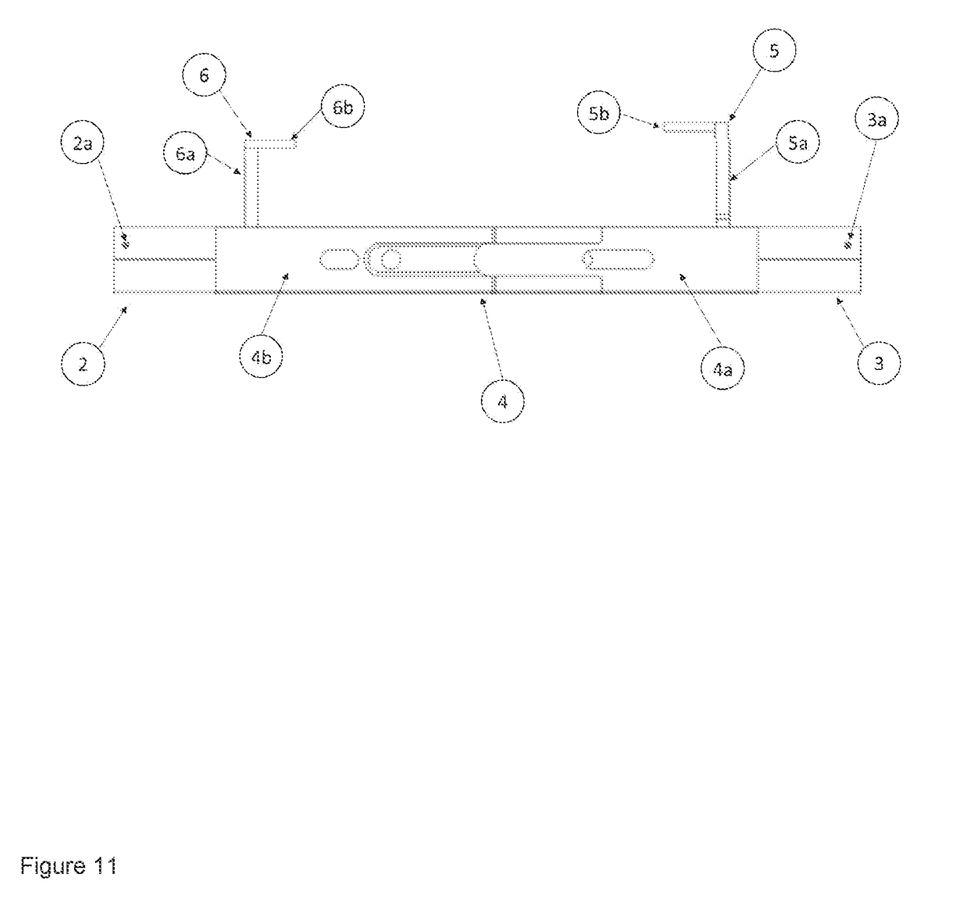
FIG. 11 shows the ELECTRO-ELECTRONIC DEVICE FOR TOILET LID AUTOMATION—bottom view.

Based on FIGS. 1, 2, 3, 4, 5, 6, 7, 8, 9, 10 and 11 it is noted that the ELECTRO-ELECTRONIC DEVICE FOR TOILET LID AUTOMATION comprises a model referenced by the indication (1) consisting of two cylindrical bodies on the left (2) and right (3) sides connected by a slender parallelepiped prismatic element (4) on whose upper part an adhesive plate (4d) is attached for finishing, in order to hide the sliding elements (4a and 4b). The cylindrical bodies pack the elements and internal mechanisms for the operation (not shown).

Presence sensors are arranged on the cylindrical bodies, driving the system to open and close the lid and the seat (3a and 2a, respectively), in addition to enabling the opening and closing of the lid and seat. Drive arms are provided for the lid (5) and for the seat (6) composed of an elongated parallelepiped shaped arm (5a) in the joint turning region of the cylindrical body (3) and connected to the driving element (5b) of the lid, in an elongated cylindrical shape for a correct accommodation at the bottom of the lid (10). The same configuration exists to activate the seat, also composed of an elongated parallelepiped shaped arm (6a) in the joint turning region of the cylindrical body (2) and connected to the seat driving element (6b) in a cylindrical shape for a correct accommodation at the bottom of the seat (11).

To ensure power supply for the operation of the assembly, an electric power input connector (7) is provided on the right cylindrical body (3).

The connecting element (4) consists of two other slender parallelepiped prismatic elements (4a and 4b) that fit through a rectangular profile guide (4c) enabling a straight movement on its own axis ensuring the alignment of the assembly set with the toilet (9).

The entire structure of the connecting element (4) is provided with internal ribs of rectangular profile (8) to provide appropriate resistance during operation.

The ELECTRO-ELECTRONIC DEVICE FOR TOILET LID AUTOMATION fits perfectly into the criteria that define its registration, that is, an arrangement or set of lines that match, giving it a general aspect with its own and functional characteristics, which can be integrated to any type of toilet built in accordance with the current Brazilian Standards (NBR's), thus configuring a new original external form.

The invention claimed is:

1. An ELECTRO-ELECTRONIC DEVICE FOR TOILET LID AUTOMATION for attaching to a toilet with a lid and a seat, the device comprising
    drive arms for the lid;
    drive arm for the seat;
    two cylindrical bodies on the left and right of the lid and the seat connected by a connecting element having an upper part to which an adhesive plate is fixed for finishing, thus hiding the sliding elements, wherein the cylindrical bodies pack the elements and internal mechanisms, and presence sensors are arranged on the cylindrical bodies, and wherein the sliding elements are adjustable in width to position the cylindrical bodies enclosing the elements and internal mechanisms, and presence sensors on opposite lateral sides of the toilet lid and seat, with the drive arm for the lid and the drive arm for the seat extending laterally inward toward a center of the toilet lid and seat to fit underneath respective ones of the toilet lid and seat;
    the drive arms for the lid and the seat are comprised of an arm in the rotation region attached to the cylindrical body and connected to the lid drive element in a shape for a correct accommodation at the bottom of the lid;

and the same configuration occurs for the seat drive, also comprising of an arm in the rotation region attached to the cylindrical body and connected to the seat drive element in a shape for a correct accommodation at the bottom of the seat.

2. An electro-electronic device for automating a toilet lid and seat, comprising:

a left cylindrical body and a right cylindrical body, each enclosing internal elements and mechanisms;

a connecting element connecting the left cylindrical body and the right cylindrical body, the connecting element including sliding elements adjustable in width to position the left and right cylindrical bodies;

presence sensors arranged on the left and right cylindrical bodies on opposite lateral sides relative to the toilet lid and seat;

a drive arm for the lid extending laterally inward from the right cylindrical body toward a center to fit underneath the toilet lid; and a drive arm for the seat extending laterally inward from the left cylindrical body toward the center to fit underneath the toilet seat.

3. The electro-electronic device of claim 2, wherein the connecting element further comprises an adhesive plate fixed to an upper part thereof for finishing and hiding the sliding elements.

4. The electro-electronic device of claim 2, further comprising an electric power input connector provided on one of the left cylindrical body or the right cylindrical body.

5. The electro-electronic device of claim 2, wherein the connecting element is provided with internal ribs to provide resistance during operation.

6. The electro-electronic device of claim 2, wherein the sliding elements fit through a rectangular profile guide enabling straight movement on an axis thereof to ensure alignment with a toilet.

7. The electro-electronic device of claim 2, wherein the drive arm for the lid comprises an elongated parallelepiped shaped arm in a rotation region attached to the right cylindrical body and connected to a lid drive element in an elongated cylindrical shape for accommodation at a bottom of the toilet lid.

8. The electro-electronic device of claim 2, wherein the drive arm for the seat comprises an elongated parallelepiped shaped arm in a rotation region attached to the left cylindrical body and connected to a seat drive element in an elongated cylindrical shape for accommodation at a bottom of the toilet seat.

* * * * *